March 11, 1952     H. A. QUIST     2,588,876
GAUGING AND SAMPLING HATCH
Filed Dec. 18, 1948                                   2 SHEETS—SHEET 1
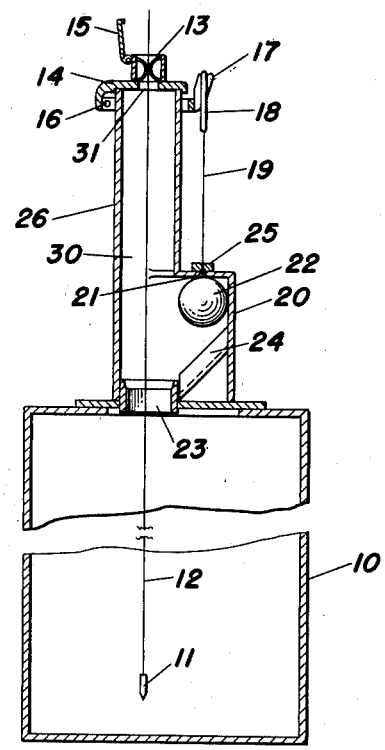
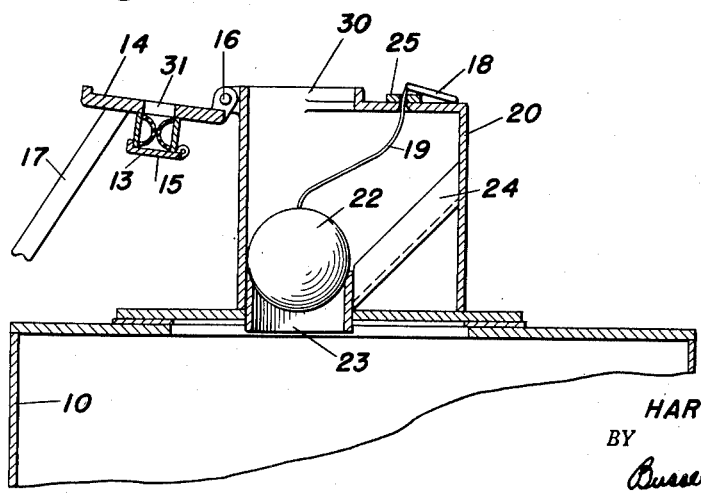
INVENTOR.
HAROLD A. QUIST
BY
*Busser and Harding*
ATTORNEYS March 11, 1952     H. A. QUIST     2,588,876
GAUGING AND SAMPLING HATCH
Filed Dec. 18, 1948     2 SHEETS—SHEET 2

INVENTOR.
HAROLD A. QUIST
BY Busser and Harding
ATTORNEYS

Patented Mar. 11, 1952

2,588,876

UNITED STATES PATENT OFFICE 2,588,876

GAUGING AND SAMPLING HATCH

Harold A. Quist, Elkton, Md., assignor to Sun Oil Company, Philadelphia, Pa., a corporation of New Jersey Application December 18, 1948, Serial No. 66,049

10 Claims. (Cl. 220—44)

The present invention relates to hatches for enclosing tank hole openings such as gauge holes, manholes, inspection covers and the like in tanks and oil refinery equipment and, particularly, in tanks such as are used for the storage of volatile oils and lighter fuels in which a safety seal is desired. More particularly, the invention relates to the details of construction which provide for a gravity closure within a hatch body which cooperates with the hatch cover in preventing the escape of volatile petroleum components within safety limits.

The principal object of the invention is to provide a hatch which can be opened for the insertion of gauging, sampling or other devices while retaining the volatile components within the storage tank.

Another object is to provide a tank closure which will retain the volatile components under safe pressure and permit the automatic ventilation of the tank when the internal pressure exceeds a predetermined amount.

Yet another object is to provide a closure for the hole in the tank, enclosed by the hatch, which cooperates with the hatch cover whereby the opening of the hatch cover releases the tank hole closure and prevents the escape of volatile components from the tank storage during the arrangement of the apparatus to be used for gauging, sampling and the like.

Figure 3:
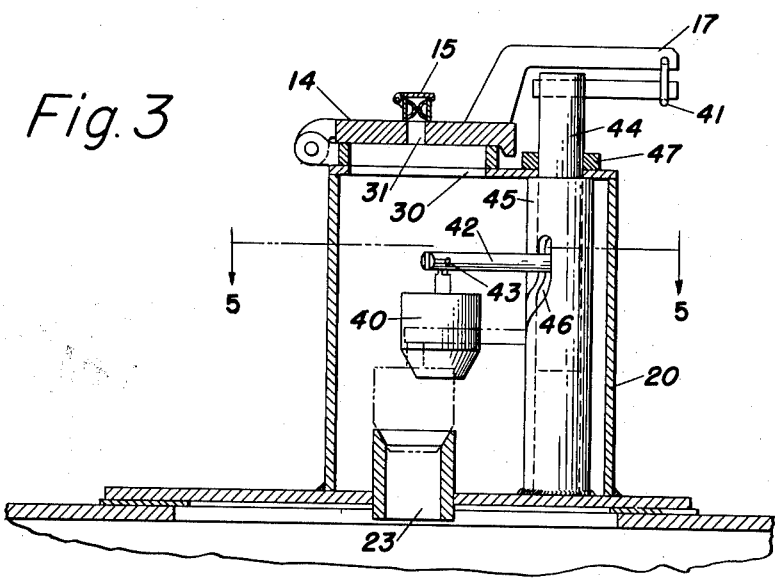
Figure 4:
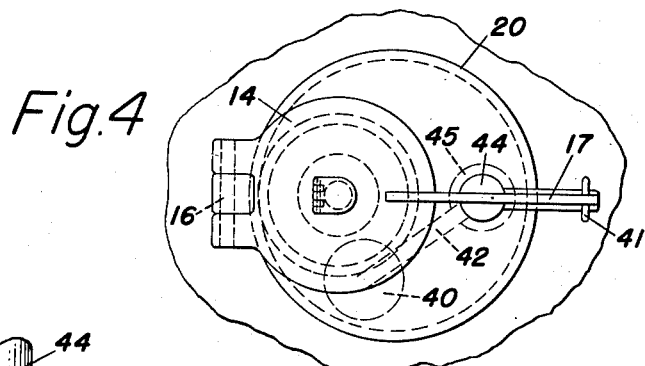
Figure 6:
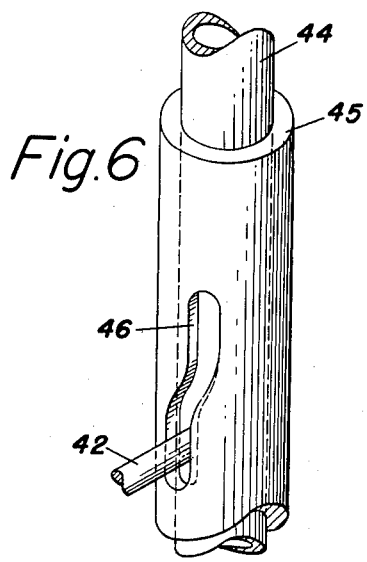
Figure 5:
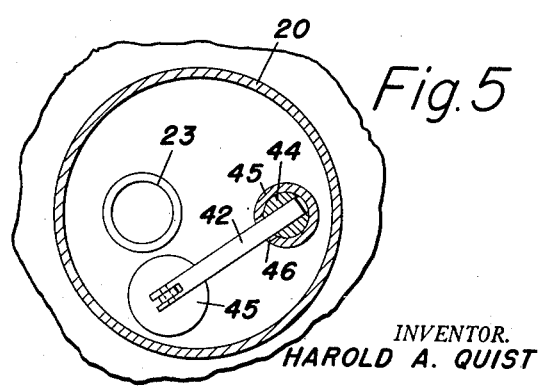

These and other objects will be more fully disclosed in the following detailed discussion in which:

Figure 1 of the drawing shows one form of the hatch structure enclosing a hole in the top of the storage tank, Figure 2 is another form of hatch, Figure 3 shows an alternate form of tank hole closure device within the hatch body, Figure 4 is a plan view of Figure 3, Figure 5 is a sectional plan view of the tank hole closure device taken on line 5—5 of Figure 3, Figure 6 is a detail of the closure guide of Figure 3.

Referring to Figure 1, the storage tank 10 is shown in sectional elevation with a gauging device 11 suspended by line 12 through a resilient gauging gate 13 in the hatch cover 14. The resilient gauging gate 13 may be a modified form of the type illustrated in Patent No. 2,445,577 to P. B. Drane et al. A hinged cover 15 is supplied to protect the gauging gate 13 from above. The hatch cover 14 is hinged at 16 and mounts a latching arm 17 which is positioned to engage ring 18 on flexible cable 19 which passes through the wall of the hatch body 20 at a point 21. The flexible cable 19 is permanently fastened to a stopper 22 which may take the form of a sphere as shown, and is enclosed within the hatch body 20. It is directed to the tank hole 23 by guide 24 as it slides into place by gravity effect. A flexible gasket 25 or similar non-leaking device encloses flexible cable 19 to prevent the escape of volatile constituents.

Superimposed upon the hatch body 20 is gauging chamber 26 which illustrates one form of hatch disclosed in this specification. This chamber may be eliminated as will be noted in discussion of Figure 2, but is included in the form of hatch now under discussion. This additional chamber 26 assists in preparing instruments used for internal exploration in the storage tank 10 when they are of great length and considerable room for arrangement of the instruments is required. It will be noticed in this Figure 1 that the closure 22 is removed from the tank hole 23 and held above or against the guide 24 by the flexible cable 19 and ring 18 which engages the cover latch 17 when the cover 14 is closed.

Figure 2 is a modification of the tank hatch 20 which omits the superimposed gauging chamber 26 (Figure 1) and illustrates the position of stopper 22 closing the tank hole 23 when the ring 18 has been removed from the tank latch 17 to open the hatch cover 14. Rotation of the hatch cover about the hinge 16 uncovers the hatch aperture 30 which, it will be noted, is directly aligned with the tank opening 23 to facilitate the passage of instruments for operations within the storage tank 10. The resilient gauging gate 13 is shown in place above the opening in the hinged cover 14 as one means of closing this instrument operating hole 31. A threaded plug, relief valve or other stopping device may as easily be used if desired.

Figure 3 is an illustration of a modification of the tank hole 23 closure device which is described above as a simple stopper 22 manually controlled by flexible cable 19. This modified structure, shown in elevation, is particularly adaptable to larger tanks and for larger openings such as manholes. The closure 40 for tank hole 23 is shown here as a cylinder, beveled on the lower edges to permit seating in the tank hole 23. It is shown in the position which it will assume when the hatch cover 14 is closed and the latching device 41 engages the cover latch 17. Figure 4 is a plan view of Figure 3 illustrating the rotation of the stopper 40 in gaining clear access to the tank contents when the cover 14 is closed for gauging or other operations.

To clarify the relative positions of the stopper 40 and the tank hole 23, Figure 5 is added. This is a sectional view taken along line 5—5 of Figure 3 and shows the final position assumed by the stopper 40 in the horizontal swing away from the tank hole 23 to permit exploration within the storage tank.

The description of this alternative form of tank hole closure, which uses rigid members as contrasted with the flexible cable controlled device described above, requires reference to Figures 3 through 6. Returning to Figure 3, the stopper 40 is suspended from rigid member 42 by a single pin 43 which affords flexibility in seating in tank opening 23. The rigid member 42 is held in position by rod 44 which fits snugly in sleeve 45. A keyway 46, designed to guide suspending arm 42, is slotted in sleeve 45 and transmits the correct horizontal and vertical movement to stopper 40 so as to seat and clear tank hole 23. The key-way 46 in sleeve 45 is positioned so that the latch 41 and cover latching arm 17 are aligned and proximate when hatch cover 14 is closed and the stopper 40 lifted and rotated from the tank hole 23. The top of sleeve 45 where rod 44 enters the hatch body is closed with a seal 47 to prevent the loss of volatile constituents from the hatch body 20.

The operation of the above device will be clear from the detailed discussion of its component parts. However, to bring out the features of the safety pressure relief as a function of the disclosure together with the conservation of the volatile products within safe predetermined, pressure limits, the operation of the simplest form as shown in Figures 1 and 2 will be discussed with brief reference to the device detailed in Figures 3, 4, 5 and 6.

Referring specifically to Figures 1 and 2, the preferred embodiment shows a simple tank hole closure 22, manually operated from outside the hatch body 20 by a flexible cable 19 which passes through the hatch body wall. When the ring 18 is released from the hatch cover latching arm 17, the stopper 22 falls by gravity, engaging the slide 24 and settles into the tank hole 23. If the internal pressure of the tank is excessive, that is to say, is greater than the predetermined weight the sphere 22 is designed to restrain, it will not permit the sphere to seat until that pressure has been exhausted.

Assuming that the excessive pressures do not exist, or have been released on opening the hatch cover, the closure 22 will seat firmly in the tank hole 23 and prevent the further escape of the volatile products within the safe limits. Any type of device necessary to be lowered into the storage tank 10 may now be arranged within the body of the hatch 20 or within the gauging chamber 26 if the two-chambered device, shown in Figure 1, is used without the continuous loss of the volatile products. The resilient gate 13 or a similar leak preventive device is inserted above the aperture 31. The suspending member either of the flexible type such as a cable, or a jointed, rigid type is passed through the gated aperture 31 and held ready for the internal exploration of the tank and contents. The cover 14 is then closed, the ring 18 lifted to engage the latch arm 17 thereby removing the closure 22 from its seating position and holding the cover 14 closed on top of the hatch 20 or the gauging chamber 26.

The gauging or like operation is then completed, the various parts of the apparatus assuming positions shown in Figure 1, and the gauging apparatus such as noted by numeral 11 is lifted to the inside of the hatch body 20. The stopper 22 is then returned to the tank hole 23 by releasing the ring 18 from the cover latch arm 17 when the stopper seats by gravity. The hatch cover is then opened and the instrument is removed without loss of the volatile products.

Brief reference to Figures 3 through 6 illustrates a similar action with the alternative form of device using rigid controlling members. The key-way 46 guides the suspending arm 42 so that the closure 40 is required to take alignment with the tank opening 23 prior to seating therein. The reverse action of removing the stopper 40 when the hatch cover 14 is closed requires the guide to remove the closure from the tank opening 23 when the latching device 41 is pulled upward to engage the latch 17. This upward pull is transmitted through rod 44 to the operating arm 42 which lifts the closure 40 prior to causing it to rotate away from tank hole 23. The further operations of adjusting and inserting the instruments as well as the reverse operation of removing the instruments follow the procedure outlined above in discussing the flexible cable form of apparatus.

I claim:

1. A safety hatch for openings in storage tanks containing volatile liquids comprising a housing having an opening in the top thereof aligned with the tank opening, a cover for said top opening hinged to said housing, a closure in said housing adapted to seal the tank opening when said cover is open, a positioning member secured to said closure and passing through the wall of said housing for external operation, and means on said cover to cooperatively engage the positioning member and withhold the closure from the tank opening when said cover is closed.

2. A hatch for the gauging hole of a volatile liquid storage tank comprising, in combination, a valve chamber adjacent said tank and enclosing the gauging hole; a gauging chamber superimposed on and communicating with said valve chamber through an aperture in alignment with said gauging hole; a cover hinged to said gauging chamber having a centralized aperture therein for the passage of a gauging line; a closure within said valve chamber adapted to cover the gauging hole in sealing engagement when the cover is opened; and releasable means connected to said closure and in operating engagement with the cover to suspend the closure in the valve chamber when the cover is closed.

3. A hatch to minimize loss during gauging operations of storage tanks containing volatile liquids comprising, in combination, a valve chamber adjacent said tank, enclosing the gauging hole, and having an aperture in the upper wall thereof in alignment with said tank gauging hole; a gauging chamber superimposed on said valve chamber, adjacent thereto, and positioned to communicate with the valve chamber through the aperture; a removable cover on said gauging chamber; means to regulate the escape of volatile products through said valve chamber comprising a closure member adapted to engage said tank gauging hole under conditions of predetermined safe internal tank pressures when said cover is removed, a position controlling member affixed to said closure and passing through the wall of said valve chamber for external operation, and latching means releasably engaging the cover with the position controlling member to withhold the closure member from the tank gauging hole when the cover is in the closed position.

4. A hatch for the gauging hole of a volatile liquid storage tank comprising a housing above the tank having an opening in its top directly above said gauge hole, a cover movable to open and close said opening and having an aperture therein, a gauging gate adapted to seal said aperture while allowing the extension therethrough of an externally operable gauge-supporting line, a closure for the gauge hole within said housing, releasable means cooperating with the cover and connected to said closure adapted to hold the closure retracted from the gauge hole when the cover is closed.

5. The combination defined in claim 4 in which the releasable means connected with the closure includes a flexible connection allowing the closure, when said means are disengaged, to move by gravity into position to close the gauge hole.

6. The combination defined in claim 4 in which the releasable means connected with the closure includes means, manually operable when said means are disengaged, to move the closure into closing position.

7. The combination defined in claim 6 in which said manually operable means comprise an arm carrying the closure and a slide having a slot with which said arm extends and shaped to impart to the closure a combined arcuate and vertical seating movement when so manually operable.

8. A hatch for the gauging hole of a volatile liquid storage tank comprising a housing above the tank having an opening in its top directly above said gauge hole, a cover movable to open and close said opening and having an aperture therein, a gauging gate adapted to seal said aperture while allowing the extension therethrough of an externally operable gauge-supporting line, a closure for the gauge hole within said housing, closure-lifting means extending through the housing, and operable to lift the closure from its gauge hole sealing position after closure of the cover, and means in operating engagement with said cover to hold the closure in lifted position after the cover is closed and to release it from lifted position before opening of the cover.

9. A safety hatch for openings in storage tanks containing volatile liquids comprising a housing having an opening in the top thereof aligned with the tank opening, a cover for said top opening hinged to said housing, a latching arm extending from said cover, a gravity operated closure within said housing adapted to seal said tank opening, a flexible cable shorter in length than the distance from the end of the latching arm to the tank opening and passing through the wall of the housing, and a ring fastened to the flexible cable externally of the housing to engage the latching arm with the cover in the closed position.

10. A hatch adapted to cover the gauging hole in the top of volatile liquid storage tanks comprising, in combination, a lower chamber positioned to enclose, and having an aperture therein aligned with the tank gauge hole; an upper chamber adjacent said lower chamber and aligned with the tank gauging aperture, a cover hinged to the top of said upper chamber, a latching arm on said cover, and a gauging gate centrally disposed in said cover for the passage of a gauging line; closure means for said tank gauge hole including a gravity operated spherical stopper in the lower chamber, a guide cooperating with the inner wall of the lower chamber and the gauge hole to direct the spherical stopper to a sealing position; a flexible cable of a length approximately equal to the depth of the upper chamber secured to said spherical closure and passing through the wall of the lower chamber, and a ring secured to the end of the cable exterior of said lower chamber arranged to engage the latching arm on the hatch cover when the cover is closed.

HAROLD A. QUIST.

REFERENCES CITED

The following references are of record in the file of this patent:

UNITED STATES PATENTS

| Number | Name | Date |
|---|---|---|
| 2,226,060 | Johnson, Jr. | Dec. 24, 1940 |